United States Patent [19]

Berry, Jr.

[11] 4,350,726

[45] Sep. 21, 1982

[54] PROTECTIVE PAD FOR BACKPACKS

[76] Inventor: French J. Berry, Jr., General Delivery, Sandia Park, N. Mex. 87047

[21] Appl. No.: 288,663

[22] Filed: Jul. 30, 1981

[51] Int. Cl.³ .......................... B32B 3/02; B32B 5/18; B32B 5/32

[52] U.S. Cl. ...................................... 428/95; 428/215; 428/220; 428/304.4; 428/311.5; 428/314.4; 428/316.6

[58] Field of Search .................. 428/36, 91, 95, 311.5, 428/316.6, 304.4, 311.1, 314.4, 314.8, 215, 220; 224/215, 264

[56] References Cited

U.S. PATENT DOCUMENTS

| | | | |
|---|---|---|---|
| 3,650,867 | 3/1972 | Bauer | 156/82 |
| 4,187,337 | 2/1980 | Romageon | 428/95 |
| 4,199,639 | 4/1980 | Rone | 428/300 |

*Primary Examiner*—William J. Van Balen

*Attorney, Agent, or Firm*—Paul D. Gaetjens

[57] ABSTRACT

A multipurpose pad especially for use in back packing constructed of open, partially open or closed cell foam bonded to a synthetic wool fleece. When used by humans the fleece side is against the skin and the pad has a total thickness of approximately one inch, one-half inch of fleece and three-eighths inch of foam.

5 Claims, 5 Drawing Figures

PROTECTIVE PAD FOR BACKPACKS

BACKGROUND OF THE INVENTION

This invention relates to multipurpose protective pads, and more particularly to pads designed to provide cushioning relief from the pressure, chafing and irritation occurring from wearing a back pack. Each pad is composed of two materials bonded together, one material being a spongy foam and the other a sheep-like fleece, with each material being approximately one-half inch in thickness. These two materials which are bonded together may then be cut to a pad of any desired shape or size. The uniqueness of these pads is the combination of two materials that function better than any single material. The pads are used by placing the fleece side against the skin underneath all clothing at those points of greatest distress and contact with the load. The inventor has found that a foam pad by itself placed against the skin is hot and irritating, while fleece by itself does not provide adequate padding protection. In combination, the foam absorbs the shape of clothes, folds and bumps, belts and buckles, and, just as importantly, distributes the load stress to the fleece portion of the pad which provides an irritation-free surface next to the skin. This feature is of critical importance because the inventor has found that any kind of pad of any thickness and/or material was unsatisfactory unless it could be placed next to the skin; that is, there is no combination of padding construction that would provide adequate relief if worn on the outside of the clothing.

Since the introduction of padded hip belts to backpacking frames, there have been numerous attempts to provide relief from the irritation, discomfort, and stress that is experienced when wearing a back pack. These attempts to provide relief have fallen into two categories: the first has been the manufacture of a pad that is attached externally to the hip belt; the second has been the construction of various shapes and forms of hip belts with different cushioning materials incorporated in a fabric shell. These cushioning materials attempted to provide relief and comfort based upon the inherent comfort (i.e., softness, padding, etc.) of the hip belt itself. Both of these methods, however, have proved unsatisfactory because they do not address the source of irritation and discomfort which is the compression and friction of intervening materials between the wearer's hip belt and skin. Such materials are commonly underclothes, pants, shirt, belts, etc. The result of either of the two approaches is unsatisfactory because even if a person were to wear his back pack with no clothes whatsoever, the hip belt materials or pads would themselves become the intervening items and continue to produce irritation and pain due to the friction and compression of the materials against the skin. For some people, the discomfort and pain become so acute that it is only possible to use the hip belt for very short periods of time with distress accumulating and remaining even days after the pack has ceased to be used.

The invention described herein provides significant relief from the above-mentioned difficulties because of a new and unique combination of materials which not only allow the device to be placed and retained in the specific position where it will provide maximum benefit, i.e., against the skin, but additionally, which embodies previously unattainable performance characteristics in the described applications. The unique combination of materials used in the construction of the pad produces two effects which achieve the objects of this invention. The foam molds itself to the body contours and the fleece, compressed against the skin, provides a surface that moves with the skin as the skin moves over the body structure. This is why the pad works so well to prevent abrasion of the skin. In testing it was found that a single material pad alone will not do this, as it will cause skin trauma and is prone to move out of position.

Also during the testing of the hip belt suspension systems marketed to date it was found that they all produce accelerated wear of the clothing that intervenes between the hip belt and the body. This is true especially at the locations over each hip bone, at the center of the small of the back, directly underneath the front buckle of the hip belt and in the area of the shoulder straps. Two of the contributing factors to this phenomenon are the abrasion of the intervening clothes fabrics between the belt and straps and the skin, and the transfer of skin oils and perspiration to a concentrated area of fabric. Both of these result in abrasion and breakdown of the fabric. The placement of a pad of the nature described herein results in a barrier prohibiting the transfer of sweat and skin oils to the clothes, and in addition, the pads, clothing, and hip belt become fixed and set into the foam of the pad reducing the abrasive friction and movement that causes the wear of clothing items. The pad of this invention is constructed of materials that accept the shape and volume of cloth, clothing, folds of material, or belts. The effect of wearing a pad is to enhance the longevity of clothes worn and produce no abnormal wear, abrasion or chemical interactions with the clothing.

OBJECTS OF THE INVENTION

It is therefore an object of this invention to reduce or alleviate completely the pain, discomfort, skin irritation, and injury related to, and incident to, wearing a hip belt carry system with a back pack carried by humans.

It is another object of the invention to provide an extremely durable pad which can be worn beneath clothing without entailing any modification of this clothing and which will reduce wear on this clothing, and which inherently tends to stay in place.

It is a further object of this invention to provide a pad that is of low cost, and minimum weight.

It is still a further object of this invention to provide a pad that is easily manufactured in various shapes and sizes and which can be altered by the user to satisfy a particular need or application.

It is another object of this invention to provide a pad which can be used to buffer or protect animals carrying loads and objects such as cameras or any item needing the special protective features of this invention.

Additional objects, advantages, and novel features of the invention will be set forth in the description which follows, and will become apparent to those skilled in the art upon examination of the following or may be learned by practice of the invention. The objects and advantages of the invention may be realized and attained by means of instrumentalities and combinations particularly pointed out in the appended claims.

SUMMARY OF THE INVENTION

The pad is constructed by bonding together a spongy foam and fleece. In the preferred embodiment fleece is a synthetic pile wool made of polyester fiber which is woven into a polyester cloth backing. The spongy foam has a closed cell structure and in the industry is commonly referred to as a cross linked polyethylene of 2 pounds per cubic foot density (One tradename for such a foam is "Superlite") and is three-eights inch thick. To this foam the polyester fleece is bonded, by any appropriate adhesive. The resulting combination is a pad with one side being a spongy foam and the other side being a synthetic wool fleece with a combined thickness of approximately one inch.

Two critical features of this protective pad are that the fleece side of the pad must be placed next to the skin, and be no greater than one inch thick. In fact, the preferred thickness is one-half inch for the synthetic polyester wool fleece and three-eighths inch for the spongy foam. Pads of less thickness do not provide adequate protection, and thicker pads could not comfortably be worn under clothing.

DEFINITIONS

The following terms are defined for the purposes of understanding the limitations and parameters of this invention:

(a) fleece—the spun, pile wool coat and skin of a sheep or any animal, or the synthetic product (man-made) similar to the animal's coat. Thus, fur, natural hair or the simulating synthetic product is included within the scope of the term "fleece."

(b) foam: a light, spongy synthetic or natural rubber or plastic material exemplified but not limited to the three classes of foam listed below:

a. closed cell—a cross-linked polyethylene with a density of two pounds per cubic foot.
b. open cell—a fully reticulated polyester urethane.
c. partially open cell—a partially reticulated polyether.

(c) bonding agent—any adhesive that will join or bond the said fleece and foam, for example, epoxy resin, contact cement, etc.

PREFERRED EMBODIMENT OF THE INVENTION

Figure 1:
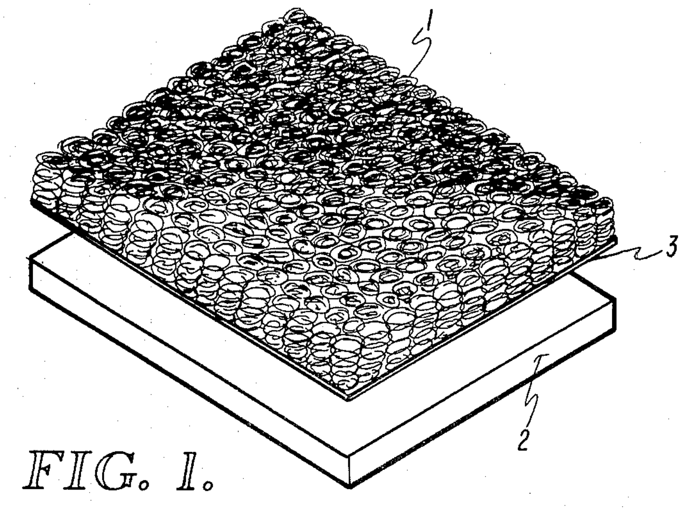
FIG. 1 is a perspective view of the two major components of the pad of this invention.

FIG. 1 shows the two major components of the protective pad of this invention. In particular, a polyester fleece 1 is superimposed on a closed cell foam 2. The synthetic wool fleece 1 is a product known in the yardage industry under the tradename "Shearling." "Shearling" is a polyester fiber spun into yarn and woven into a polyester cloth backing 3, providing a facsimile of trimmed sheepskin fleece. The preferred closed cell foam 2 goes under such tradenames as "Superlite" or "Polarafoam", etc. and is currently the lightest weight of all available closed cell foams.

Figure 2:
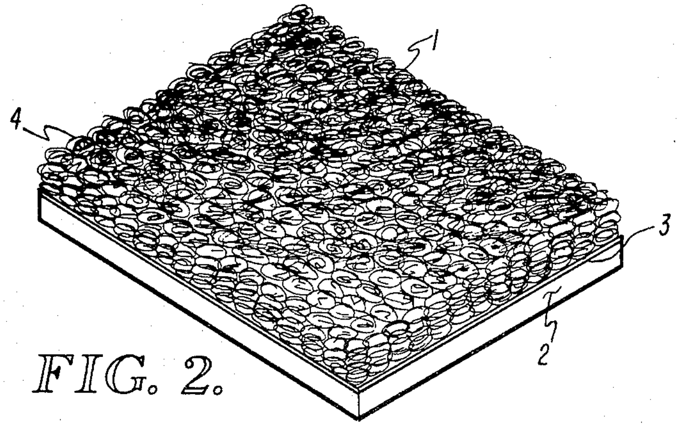
FIG. 2 is a perspective view of the pad when the components of FIG. 1 are bonded together.

FIG. 2 shows the two components of FIG. 1 preferably joined together by any flexible, waterproof bonding agent, for example, contact cement. The cloth side of the polyester fleece 3 is bonded to either side of the foam 2, thus producing a pad 4 of which one side is foam 2 and the other side is fleece 1. The total thickness of the pad 4 is approximately one inch, with the foam being three-eighths inch thick and the fleece being one-half inch thick. Normally, pads used for hip belt protection have a surface dimension of 4 by 5 inches and are slightly rounded at the corners.

Figure 3:
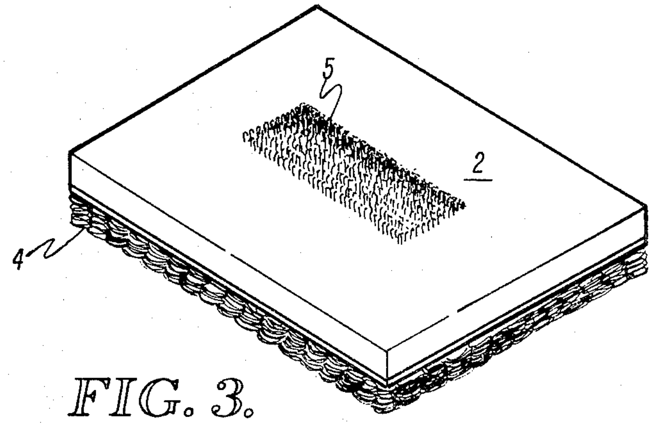
FIG. 3 shows the addition of Velcro to the foam side of the pad.

FIG. 3 shows the pad 4 of this invention with the attachment of one side of velcro tape 5 to the foam 2. The Velcro allows the pad to be attached to the surface of a load which has the corresponding mating surface of Velcro attached to it, which keeps the pad 4 in the desired position. Velcro can be sewn and/or bonded to the foam pad and a corresponding mating surface of Velcro may be bonded anywhere, e.g., to straps or surfaces of packages especially now that Velcro is available with self-adhesive backing which will stick to almost any surface. Some applications of this feature are as follows:

(1) Pads could be attached to the sides of a fragile piece of equipment that needs protection.

(2) Pads could be attached externally at any position to pack straps and belts.

(3) Any application where pad placement security could not be achieved by pressure alone.

Figure 4:
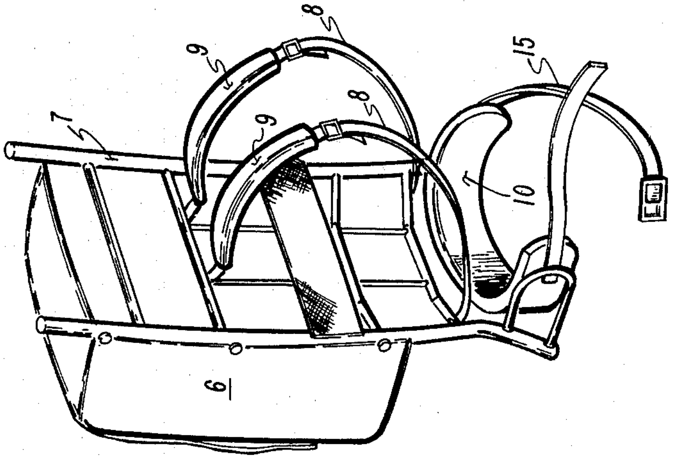
FIG. 4 is a perspective view of a typical commercial back pack having a hip belt.

FIG. 4 shows a typical commercial back pack 6 with frame 7, shoulder straps 8 having padding 9, with hip belt 10 and straps and buckle 15.

Figure 5:
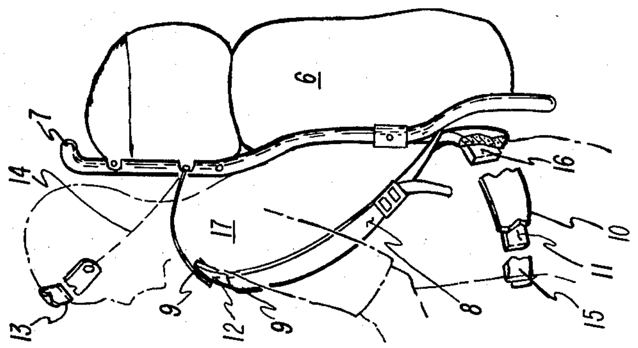
FIG. 5 is a side and partial cutaway view of FIG. 4 with the addition of a tump line to the backpack showing typical placements of the pads of this invention.

In FIG. 5, a human FIG. 17 is depicted to show where the pads of the invention would be placed to protect against irritation. In particular, a pad 13 would be used across the forehead under the tump line strap 14. Another pad 12 of this invention is placed against the skin (under the shirt) where the straps 8 with padding 9 cause pressure against the shoulder. The pack 6 with frame 7 has a hip belt 10 with straps and buckle 15. Pad 16 is placed under the pants against the skin at the small of the back. Pads 11 are placed over each hip bone region under all clothing.

There is available a wide variety of open, partially open and closed cell foams, all of which may be used as less desirable substitutes for the preferred closed cell, cross-linked polyethylene foam of 2 pounds per cubic foot density. None of these alternative products, however, possess all of the desired characteristics such as absolute minimum weight, adequate shock absorbing and buffering qualities in minimum possible thickness, the ability to form a "memory pattern" of clothing materials or belts which absorbs the shapes and irregularities of these items in such a way that the stress is optimally passed on to the fleece side of the pad. All of this is important because other foam products may be adequate in one respect or another but none of the currently available products performs nearly as well in all necessary respects as the cross-linked polyethylene of 2 pounds per cubic foot density which goes under the tradenames of "Superlite", "Polarafoam", etc. Two examples of other closed cell foams which are not as suitable are closed cell neoprene, which is used in skin diving wet suit construction, and a product called "Ensolite" a composition of nitrile rubber and polyvinyl chloride and used in many hip belt constructions as a padding material.

Synthetic wool fleece comes in a variety of thicknesses and colors. The one-half inch thickness was found to be most suitable in all respects for human use. Other applications may require different thicknesses.

Many other applications of this invention readily suggest themselves in addition to the ones above stated. Thus, while the invention has been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

What is claimed is:

1. A protective pad for backpacks comprising:

(a) a pile fleece, said fleece consisting of one-half inch thick fibers woven into a cloth backing, (b) a bonding agent or adhesive, (c) a spongy, light-weight foam, said foam consisting of an organic material having an open, partially open or closed cell structure and being about three-eighths inch thick, (d) said fleece is bonded to said foam with fleece side of the pad being placed directly against the skin, and (e) the total thickness of said pad being approximately one inch.

2. The pad of claim 1 in which the foam has a closed cell structure.

3. The pad of claim 1 in which the foam has a open cell structure.

4. The pad of claim 1 in which the foam has a partially open cell structure.

5. The pad of claim 1 in which said fleece is a polyester fiber woven into a polyester cloth backing, and said foam is a closed cell, cross linked polyethylene having a density of two pounds per cubic foot.

* * * * *